Sept. 10, 1929.  J. C. BERGNER  1,727,857
COOKING APPARATUS
Original Filed Feb. 17, 1921  4 Sheets-Sheet 1
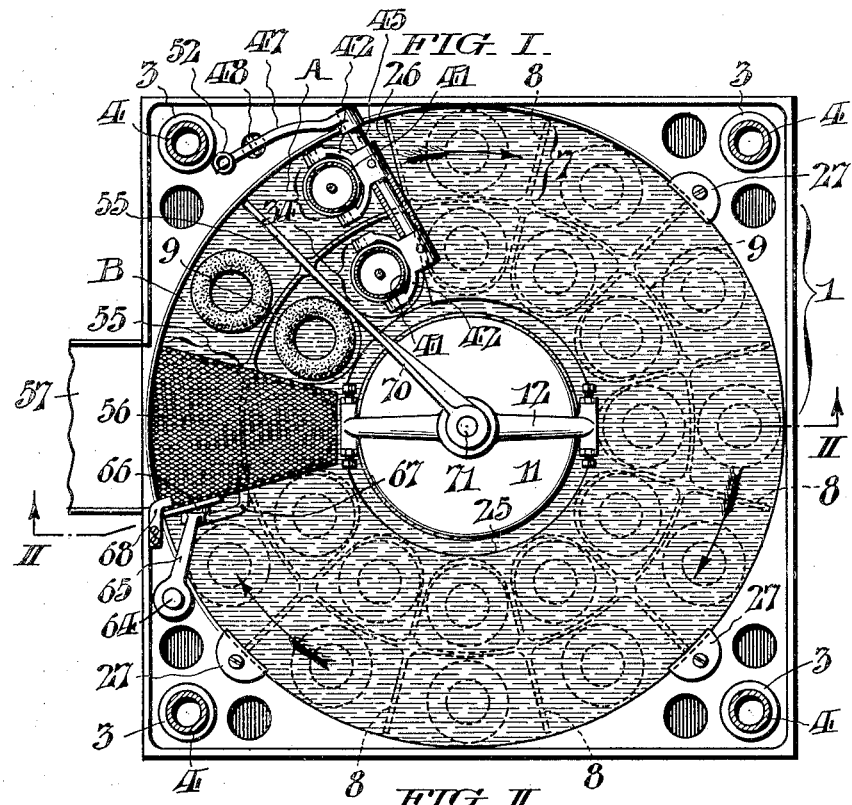
FIG. I.
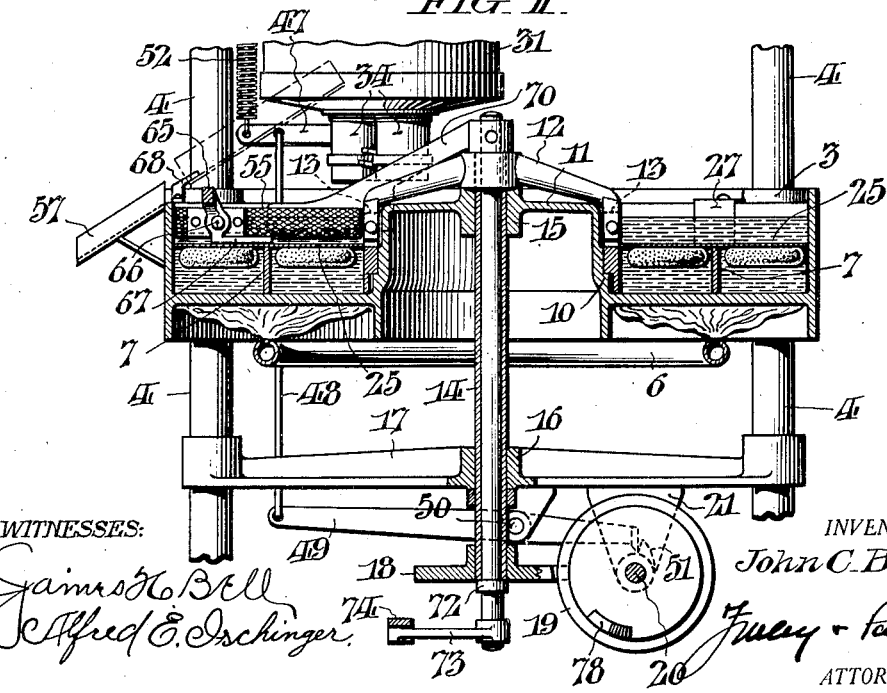
FIG. II.
WITNESSES:
James H. Bell
Alfred E. Ischinger
INVENTOR:
John C. Bergner,
ATTORNEYS.

Sept. 10, 1929.    J. C. BERGNER    1,727,857
COOKING APPARATUS
Original Filed Feb. 17, 1921    4 Sheets-Sheet 2
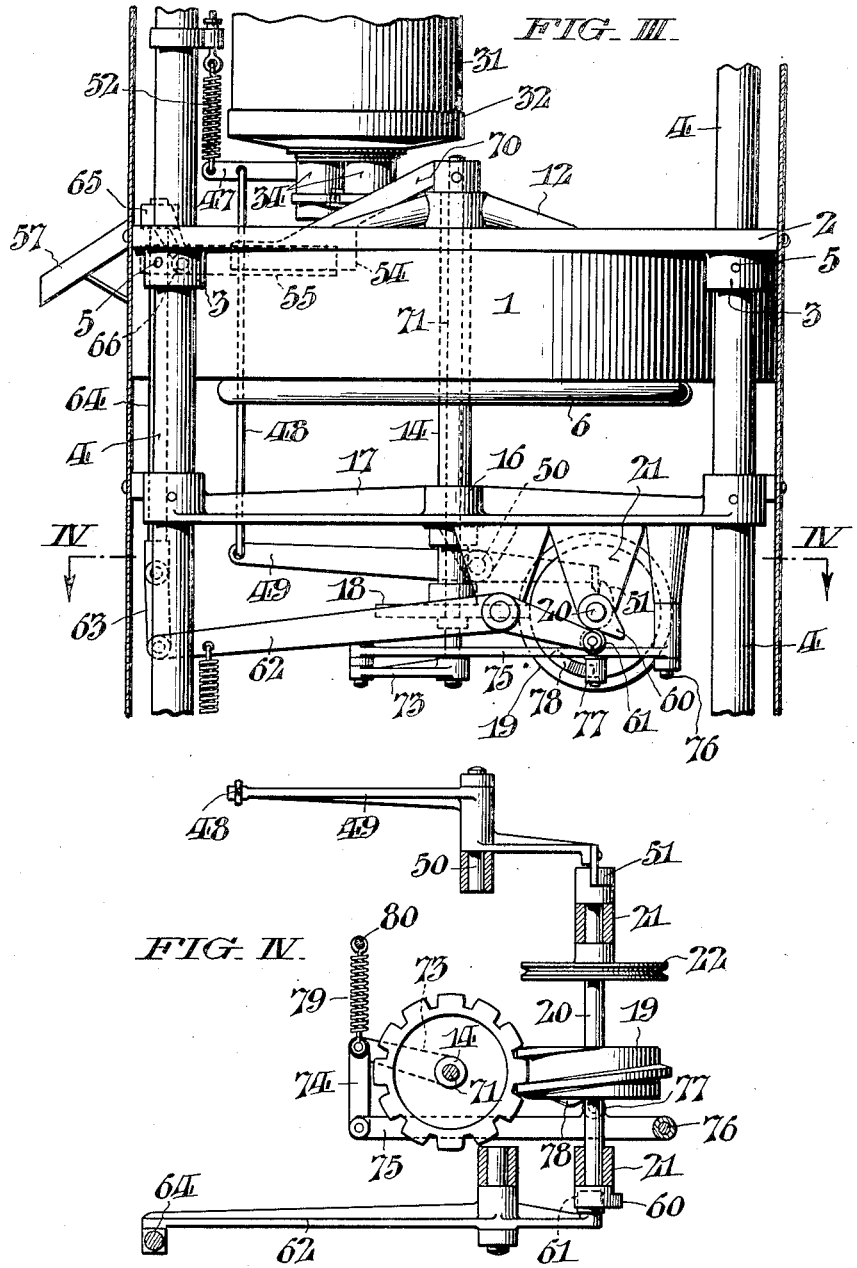

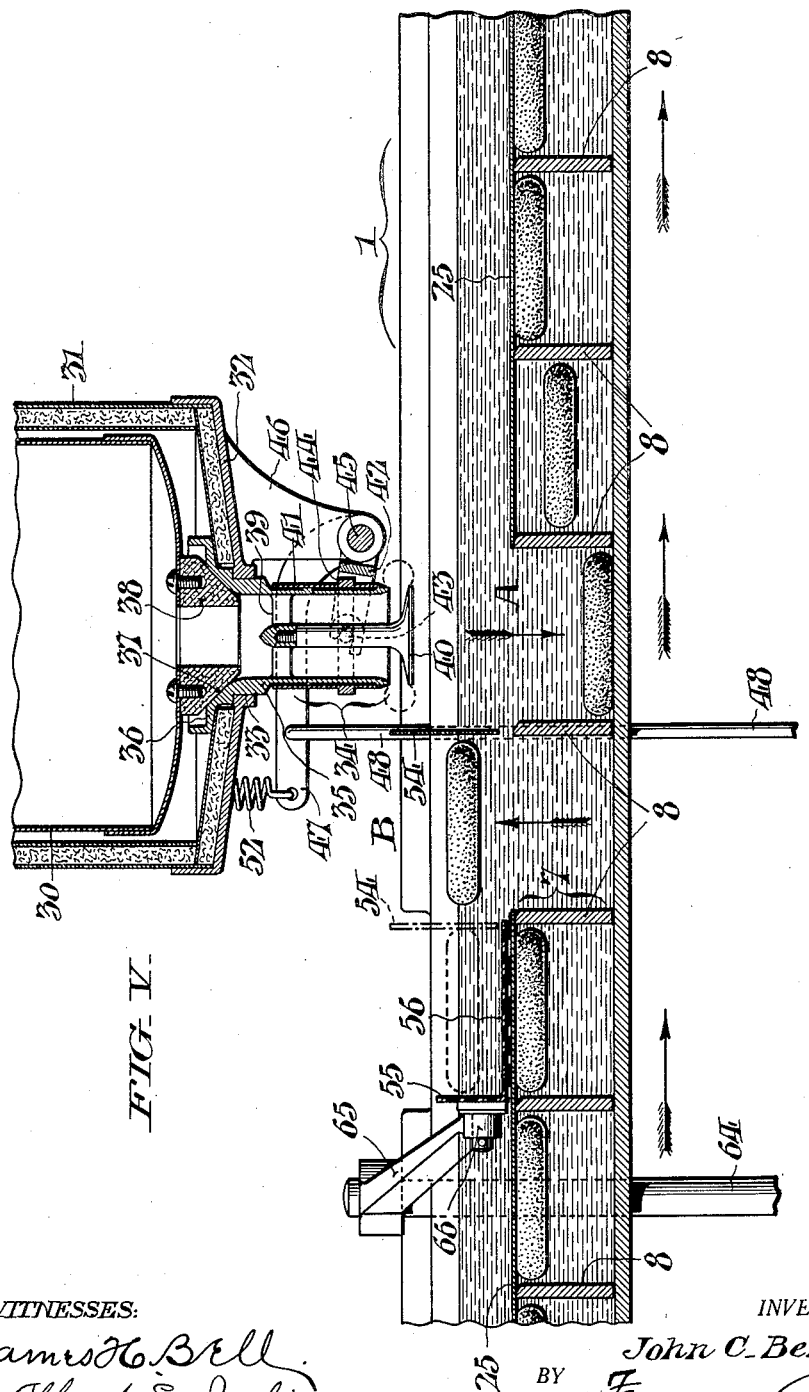

Sept. 10, 1929.  J. C. BERGNER  1,727,857
COOKING APPARATUS
Original Filed Feb. 17, 1921  4 Sheets-Sheet 4
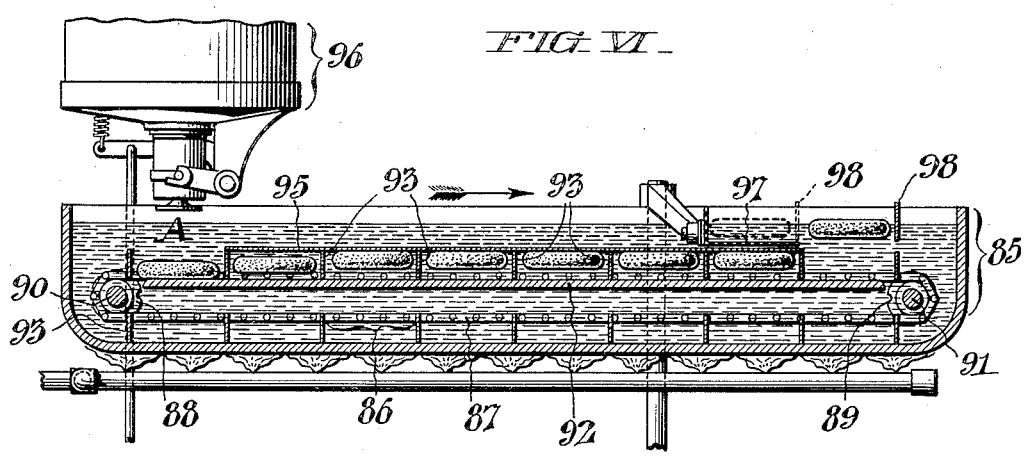

Patented Sept. 10, 1929.

1,727,857

UNITED STATES PATENT OFFICE.

JOHN C. BERGNER, OF LANSDOWNE, PENNSYLVANIA, ASSIGNOR TO DOUGHNUT MACHINE CORPORATION, A CORPORATION OF NEW YORK.

COOKING APPARATUS.

Application filed February 17, 1921, Serial No. 445,637. Renewed February 1, 1929.

My invention relates generally to apparatus in which hot liquor is employed to effect cooking, and more especially to apparatus useful in cooking doughnuts and the like. In cooking doughnuts as ordinarily practiced, the dough formations are dropped into hot cooking liquor, and, after being cooked on one side, are turned over or inverted so that the cooking of the opposite side may be likewise accomplished.

The object of my invention is to make it possible to cook doughnuts without the necessity for turning them, and this I accomplish by maintaining the formations submerged in the cooking liquor, in the course of progression through the apparatus, for a time period by which their thorough and complete cooking is assured.

Other objects and advantages of my invention will become readily apparent from the detailed description which follows:

In the drawings, Fig. I is a plan view of a cooking apparatus conveniently embodying my invention.

Fig. II is a staggered axial sectional view of the same along the line of the arrows II—II in Fig. I.

Fig. III is a side elevation of the structure, except for the enclosing casing, which is shown in section.

Fig. IV is a detail plan sectional view along the plane of the arrows IV—IV in Fig. III.

Fig. V is a diagrammatic illustration, on an enlarged scale, from which the operation of the machine may be readily understood; and Fig. VI is a longitudinal sectional view of a modified form of my invention.

Referring more particularly to Figs. I and II, it will be seen that a container or trough 1 is provided for the cooking liquor. Said trough is circular, except for an integral, rectangular top or splash apron 2 which has at its corners, bosses 3, 3, through which pass the uprights 4, 4, of the supporting frame structure of the machine, rigid attachment being effected by pins 5, 5. The liquor in the container may be heated by any approved means, such for example, as a circular gas burner represented conventionally at 6. As shown to best advantage in Fig. II, the cross sectional configuration of the container is such as to afford an annular well within which rotates a progressing means in the form of a spider 7 comprising a number of radial arms 8, joined, at a point intermediate their lengths, by a circular web 9. The spider is supported on a bearing shoulder 10 formed about the central portion 11 of the container. By such construction of the spider, individual receptacles or cells are provided for the accommodation and guidance of the articles being cooked as they are progressed about the receptacle in a manner which will become more readily apparent from further description. Moreover from the illustrations it will be noted that said cells or receptacles are arranged in radial rows or groups, which groups are successively presented first, at the station "A" where the articles to be cooked are received, and then after being progressed about the container in the direction of the arrows in Fig. I, at the ejecting station "B" where they are discharged from the apparatus concurrently with the reception of other articles in the cells then at the adjacent station "A".

The progressing means is rotated by means of a yoke arm 12, whose down turned ends are bifurcated to engage with upstanding lugs 13 of the spider. The yoke arm 12 is fixed to a hollow shaft 14 journalled at its top in an axial bearing 15 forming part of the container 1. Near its lower end, hollow shaft 14 is journalled in a bearing 16 of a horizontal cross frame 17 disposed at a level below the container 1 and secured to the uprights 4 in a manner similar to that described in connection with said container. To the lower end of the shaft 14 is secured a worm wheel 18, which is constantly driven, at a slow rate of speed, by an intermeshing worm 19 mounted upon a drive shaft 20. Said shaft is journalled in suitable bearings 21, 21, depending from the cross frame 17, and also carries a sheave 22 adapted for connection with any suitable source of power.

Above the spider 7 is a diaphragm 25, which spans the annular trough of the container except at the stations "A" and "B", where the articles to be cooked are received and discharged. These stations, (see Fig. I), are directly adjacent, thus necessitating but a single opening 26 in the diaphragm for initial admission and ultimate egress of articles. Said diaphragm is held in place by aid of integral upstanding ears 27, whose laterally turned ends are secured, preferably by screws, to the top surface of the splash apron 2 of the container, as shown. The function of the diaphragm is to maintain the articles being cooked depressed so as to be held submerged in the cooking liquor, and, at the same time, retained within the individual receptacles or cells of the progressing means.

The means (Fig. V) by which the articles are formed comprises a storage receptacle 30 for the dough, said receptacle being housed within a casing 31 having suitable insulatory walls, so that the dough is protected against the hot fumes rising from the cooking liquor. The casing 31 may be supported in any convenient way from the structural frame of the machine, and its base 32 is preferably in the form of a casting which has openings 33 for the reception of cutter devices comprehensively designated at 34, 34. Each of said cutter devices comprises a cylindrical shell 35 formed at its top with an enlargement 36 having a conical seat 37 which cooperates with the correspondingly shaped neck 38 on one of the outlets of the receptacle 30. Suspended from a bridge piece 39 which spans the axial opening of the shell 35, is a disk 40. Said disk is spaced at a suitable distance from the lower end of the shell so as to afford an annular outlet through which extrusion is effected under pressure applied, in any approved manner, to the dough in the receptacle. Adapted for coöperation with the disk 40 is a cutter sleeve 41, which encircles the lower reduced portion of the shell 35, and is thus guided thereby, suitable clearance spaces being provided, as indicated by the solid shading, to insure free movement of the sleeve notwithstanding the possible packing of any dough between the relatively movable surfaces. The cutter sleeve 41 is reciprocated vertically by means of a yoke arm 42, the outer ends of which engage pins 43 on an annular enlargement 44 of said sleeve. The yoke arms 42 of the several cutter devices, in order that they may be simultaneously operated, are fixed to a common shaft 45, which is journalled in a suitable bearing 46 depending from the base 32 of the casing 31, and actuated through the instrumentality of an attached arm 47. A link 48 connected at one end with the arm passes through an opening in the splash apron 2 of the receptacle 1, and engages, at its lower end, with one extremity of a lever 49 beneath said receptacle. The lever 49 is adapted to rock about a fixed pivot 50 under the actuation of a cam 51 secured upon one end of the shaft 20, previously referred to. By the connections just described, the cutters are operated once for each rotation of the shaft 20, in correspondence with the action of the worm 19 in its effect upon the movement of the progressing means. In order to insure quick retraction of the cutter sleeves 41, 41, the actuating arm 47 of the cutter is subject to the action of a spring 52, (see Figs. III and V).

Thus, at each actuation of the cutters, the released formations simultaneously drop into one of the groups of radially disposed receptacles or cells of the progressing spider 7, and immediately sink to the bottom of the receptacle, and, under succeeding movement of the progressing means, are advanced beneath the diaphragm 25. After becoming buoyant from expansion by the gases generated during the cooking, the formations gradually rise within their retaining receptacles or cells, as suggested in Fig. IV, and are thereafter held depressed by means of the diaphragm 25 as previously noted, in order to be maintained submerged in the liquor. After completing the circuit about the receptacle and reaching the end of the diaphragm 25 at the station "B", the articles thus released rise instantly to the surface of the liquor under their own buoyancy. In practice, the speed of rotation of the progressing means is so ordered that the time period intervening between the successive introduction and the subsequent release of the articles as just described is of ample duration (usually from a minute and a half to two minutes) so that thorough cooking is assured. After being released, the floating articles are shifted or moved back by means of a vane 54 to a central postion over the top of an ejector 55 located adjacent (in advance of) the station "B", above the diaphragm 25 and the progressing means 7. The supporting surface 56 of the ejector is normally at a substantial distance below the level of the liquor, so that the articles may readily float over the top of the same. After the articles are positioned over the ejector, the latter is elevated and incidentally tilted to the angular position, suggested in dot and dash lines in Fig. II, to automatically discharge the cooked articles to a delivery chute 57, by which they may be directed to any suitable collecting receiver.

The means by which the ejector is operated may be briefly described as follows:

Secured to the end of the shaft 20, opposite to that occupied by cam 51, is a second cam 60 adapted to coöperate with a roller 61 on a rock arm 62. The opposite end of arm 62 is connected, by means of a link 63, with a vertical rod 64 guided for vertical reciprocation in a suitable bearing in the splash apron 2 of the container 1. To the protruding top end of the slide rod 64 is secured an arm 65 to the extremity of which the ejector 55 is pivotally attached as indicated at 66. An extension or finger 67 of the arm 65 underlies the supporting surfaces 56 of the ejector, and holds the same normally in horizontal position. As the ejector is raised, it is engaged, at its forward end, by a stop 68 which serves to tilt the same about the pivot 66 to bring about the discharge of the cooked articles in a manner already understood.

The vane 54 by which the articles are shifted to the position over the ejector 55 is carried upon an end of a radial arm 70 fixed to the top end of a vertical shaft 71 which extends axially through the hollow shaft 14 previously referred to, and is held from axial displacement with respect to the latter by a collar 72, see Fig. II. The shaft 71 is oscillated by means of a lever 73 connected by link 74 to an arm 75, capable of being rocked about a fixed pivot 76. The arm 75 carries a roller 77, which cooperates with a laterally extending edge cam 78 on the worm 19 to rock said arm. The roller 77 is constantly maintained in operative contact with its actuating cam through the instrumentality of a coiled spring 79 attached at one end to the lever 73, and at the other end to a fixed anchorage 80, (see Fig. IV). In practice, the movement of the ejector will, of course, be timed in correlation with the movements of the cutters and progressing means.

Referring now to the modification of my invention shown in Fig. VI, the container or trough 85 for the cooking liquor takes a rectangular shape. While I have shown in this figure only a longitudinal sectional view through such a structure, it is obvious that the same may be of any width so that the articles to be cooked may be introduced in rows in a manner similar to that explained in connection with the first described embodiment. In this instance, instead of a rotating progressing means, I employ an endless conveyor 86 which may comprise one or more sprocket chains 87 adapted to be driven and guided over sprocket wheels 88 and 89 mounted upon shafts 90 and 91, said shafts being journalled respectively at opposite ends of the container 85. The upper run of the chains 87 are supported by a plate 92 which extends transversely of the container and is substantially coextensive with the same in length. The sprocket chains 87 carry a series of transversely extending vanes 93, which, by co-operation with the plate 92, afford separate receptacles or cells for the articles to be cooked. A stationary diaphragm 95 serves, as in the first embodiment, to maintain the articles depressed beneath the surface of the cooking liquor during progression through the apparatus. The articles to be cooked are cut and introduced by a forming device 96 located at a station "A" at one end of the container 85, and withdrawn by an ejector 97 at the opposite end of the container, a vane 98 acting in cooperation with the ejector in a manner already understood.

Having thus described my invention, I claim:

1. Apparatus of the character described comprising means for progressing articles to be cooked submerged in the cooking liquor, and releasing them at the end of the cooking period to rise by their own buoyancy; ejecting means adjacent the point of release; and means for shifting the released articles to be engaged and ejected by the ejecting means.

2. Apparatus of the character described comprising means for progressing articles to be cooked submerged in the cooking liquor, and releasing them at the end of the cooking period to rise by their own buoyancy; ejecting means normally submerged over the progressing means in advance of the point of release; and means for shifting the released articles back over said ejecting means.

3. An apparatus of the character described, including a circular container or trough for the cooking liquor; in combination with means for progressing the articles to be cooked about the receptacle while submerged in the liquor, said means comprising a series of individual receptacles disposed in radial rows or groups; and by which definite separation of the articles is assured during the cooking period; and means for simultaneously introducing the articles to be cooked into the several cells of each row or group when presented at a receiving station.

4. An apparatus of the character described, including a receptacle for the cooking liquor; means for progressing the articles to be cooked through the receptacle while submerged in the cooking liquor, said means comprising a series of individual receptacles or cells arranged in rows or groups, and by which the articles are maintained in definite separation during the cooking operation; and means for simultaneously depositing the articles into the several cells of each row or group of receptacles or cells when presented at a receiving station.

5. An apparatus of the character described, including a receptacle for the cooking liquor; means for progressing the articles to be cooked successively through the receptacle; a diaphragm for maintaining the articles submerged in the liquor during the cooking period, said diaphragm having an opening through which the successively released articles may rise, under their own buoyancy, to the surface of the liquor; an ejector occupying a position adjacent the discharge opening of the diaphragm and having its supporting surface normally disposed below the level of the cooking liquor; means for successively shifting the released floating articles to a position above the supporting surface of the ejector; and means for actuating the ejector to discharge the articles successively from the apparatus.

6. An apparatus of the character described, including a receptacle for the cooking liquor; means for progressing the articles to be cooked through the receptacle; a diaphragm for maintaining the articles submerged in the liquor during the cooking period, said diaphragm having an opening through which the articles may rise, under their own buoyancy, to the surface of the liquor; an ejector occupying a position adjacent the discharge opening of the diaphragm, and having its supporting surface normally disposed below the level of the cooking liquor; means for shifting the released floating articles to a position above the supporting surface of the ejector; and means for elevating and tilting the ejector to discharge the cooked articles from the apparatus.

7. An apparatus of the character described comprising means for progressing the articles to be cooked around a circular course in the cooking liquor and for maintaining them in definite separation, with means for maintaining the articles submerged during progression as aforesaid, substantially throughout the cooking period.

8. Apparatus of the character described comprising means for progressing articles to be cooked over a closed course in the cooking liquor; and a diaphragm for maintaining the articles submerged during progression as aforesaid having a common opening for initially receiving the articles and for permitting them to rise after making the round of the apparatus.

9. Apparatus of the character described comprising a multicellular rotary spider; and a diaphragm over said spider for maintaining articles to be cooked submerged in the cooking liquor during progression in its cells having an opening for concurrently admitting articles to and permitting them to rise from adjacent cells.

10. Apparatus of the character described comprising means for progressing articles to be cooked over a closed course in the cooking liquor; a diaphragm for maintaining the articles submerged during progression as aforesaid having an opening for their reception and egress; and an ejector for the articles movable up and down to receive them at said opening and to eject them from the apparatus.

11. An apparatus of the character described, including a circular container or trough for the cooking liquor; means for progressing the articles to be cooked about the receptacle while submerged in the liquor, said means comprising a series of individual receptacles disposed in radial rows or groups, and by which definite separation of the articles is assured during the cooking period; in combination with means for forming the articles to be cooked including a dough container; a series of die outlets arranged radially in correspondence with the cell groups of the progressing means; cutting means cooperative with said die outlets for severing the extrusions; and devices for simultaneously operating said cutting means, when said groups are successively presented at a receiving station.

12. An apparatus of the character described, including a circular receptacle for the cooking liquor; means for progressing the articles to be cooked through the receptacle; a diaphragm for maintaining the articles submerged in the liquor during the cooking period, said diaphragm having an opening through which the articles may rise, under their own buoyancy, to the surface of the liquor; an ejector occupying a position adjacent the discharge opening of the diaphragm and having its supporting surface normally disposed below the level of the cooking liquor; a radial arm for shifting the released floating articles to a position above the supporting surface of the ejector; and means for actuating the ejector to discharge the articles successively from the apparatus.

In testimony whereof, I have hereunto signed my name at Philadelphia, Pennsylvania, this 15th day of February, 1921.

JOHN C. BERGNER.